United States Patent
Dobson, Jr. et al.

(10) Patent No.: US 7,018,956 B2
(45) Date of Patent: Mar. 28, 2006

(54) CROSSLINKED POLYMER FLUIDS AND CROSSLINKING CONCENTRATES THEREFOR

(75) Inventors: James W. Dobson, Jr., Houston, TX (US); Shauna Leigh Hayden, Houston, TX (US); Belinda Emelia Hinojosa, Houston, TX (US)

(73) Assignee: Texas United Chemical Company, LLC., Houston, TX (US)

( * ) Notice: Subject to any disclaimer, the term of this patent is extended or adjusted under 35 U.S.C. 154(b) by 367 days.

(21) Appl. No.: 10/320,145

(22) Filed: Dec. 16, 2002

(65) Prior Publication Data

US 2003/0144154 A1 Jul. 31, 2003

Related U.S. Application Data

(60) Provisional application No. 60/351,509, filed on Jan. 24, 2002.

(51) Int. Cl.
*C09K 8/04* (2006.01)

(52) U.S. Cl. ............... 507/273; 507/103; 507/203; 507/922; 507/903

(58) Field of Classification Search .......... 507/103, 507/203, 273, 922, 903
See application file for complete search history.

(56) References Cited

U.S. PATENT DOCUMENTS

| | | | | |
|---|---|---|---|---|
| 4,619,776 A | * | 10/1986 | Mondshine | 507/211 |
| 5,307,877 A | * | 5/1994 | Cowan et al. | 166/295 |
| 5,363,918 A | * | 11/1994 | Cowan et al. | 166/295 |
| 5,785,747 A | * | 7/1998 | Vollmer et al. | 106/194.2 |
| 5,858,948 A | * | 1/1999 | Ghosh et al. | 510/300 |
| 6,024,170 A | * | 2/2000 | McCabe et al. | 166/300 |
| 6,148,917 A | * | 11/2000 | Brookey et al. | 166/301 |
| 6,194,370 B1 | * | 2/2001 | Williams et al. | 510/320 |
| 6,310,008 B1 | * | 10/2001 | Rietjens | 507/267 |
| 6,423,802 B1 | * | 7/2002 | Miller et al. | 526/287 |
| 6,764,981 B1 | * | 7/2004 | Eoff et al. | 507/110 |
| 6,838,417 B1 | * | 1/2005 | Bouwmeester et al. | 507/203 |
| 2004/0035580 A1 | * | 2/2004 | Bouwmeester et al. | 166/295 |

* cited by examiner

*Primary Examiner*—Philip C. Tucker
(74) *Attorney, Agent, or Firm*—Roy F. House

(57) ABSTRACT

Disclosed is a concentrate composition for crosslinking polysaccharide polymers hydrated in an aqueous liquid, and well servicing fluids, preferably fracturing fluids, prepared therewith. Preferred polysaccharide polymers are galactomannan gums or derivatives thereof, preferably hydroxypropylguar. The concentrate comprises an alkali metal formate solution, preferably potassium formate, a crosslinking agent for the polysaccharide polymer, preferably a sparingly soluble alkali metal or alkali metal alkaline earth metal borate, and a suspension agent, preferably a clay mineral selected from the group consisting of smectite clays, palygorskite clays, and mixtures thereof Exemplary clays are hectorite, sepiolite, and attapulgite. The concentrate may, optionally, contain a deflocculant and/or an anti-syneresis additive.

18 Claims, No Drawings

CROSSLINKED POLYMER FLUIDS AND CROSSLINKING CONCENTRATES THEREFOR

This patent application claims priority to U.S. Provisional Patent Application No. 60/351,509 filed Jan. 24, 2002, whose applicants and title have the same as for this patent application.

The invention comprises a crosslinker suspension for crosslinking well treating fluids containing a viscosifying crosslinkable polymer therein. Such fluids include fracturing fluids, gravel packing fluids, and the like.

BACKGROUND OF THE INVENTION

Hydraulic fracturing has been widely used as a means for improving the rates at which fluids can be injected into or withdrawn from subterranean formations surrounding oil wells, gas wells, water injection wells, and similar boreholes. The fracturing methods employed normally involve the injection of a viscous fracturing fluid having a low fluid loss value into the well at a rate and pressure sufficient to generate a fracture in the exposed formation, the introduction of fluid containing suspended propping agent particles into the resultant fracture, and the subsequent shutting in of the well until the formation is closed on the injected particles. This results in the formation of a vertical, high-conductivity channels through which fluids can thereafter be injected or produced. The conductivity obtained is a function of the fracture dimensions and the permeability of the bed of propping agent particles within the fracture.

In order to generate the fracture of sufficient length and width and to carry the propping agent particles into the fracture, it is necessary for the fluid to have relatively high viscosity, low friction loss, and non-damaging properties. The viscosity in aqueous liquids is provided by the addition of polymers, frequently called thickeners. Following the treatment of the well, it is desirable to return the aqueous liquids to its low viscosity state to enhance cleanup, thereby permitting the fracturing fluid and polymer to be removed from the formation and the propped fracture. The highly viscous liquid if left in the fracture would reduce formation permeability and impede the production of formation fluids through the propped fracture. Moreover, the residue of the polymer on the fracture face and in the pores of the propped fracture would significantly reduce fluid permeability therethrough.

The polymers used as aqueous thickeners must impart sufficient fluid viscosity at the temperature of the formation to generate the desired fracture and suspend the proppant. The polymers are frequently crosslinked to achieve the necessary viscosity.

In order to avoid the undesirable after effects of the polymer and polymer residue, it is now common practice to employ in the fracturing fluid chemicals ("breaker") which degrade the polymers. U.S. Pat. No. 4,741,401 discloses a number of oxidizing agents contained in capsules for breaking the fracture fluid. U.S. Pat. No. 3,938,594 discloses the use of sodium hypochlorite solution, acid, micellar solutions, and surfactants for degrading the fracturing fluid polymers.

In gravel packing operations, solid gravel particles such as sand are carried to the subterranean zone or formation in which a gravel pack is to be placed by a high viscosity crosslinked gelled fluid. That is, the gravel is suspended in the high viscosity fluid at the surface and carried to the subterranean zone or formation in which the gravel pack is to be placed. Once the gravel is placed in the zone or formation, the crosslinked gel is broken (degraded) and returned to the surface. The gravel pack produced functions as a filter to separate formation solids from produced fluids while permitting the produced fluids to flow into and up the wellbore.

The polymers and crosslinking agents used in well treating fluids are well known in the art. Typical hydratable, water-soluble polymers which can be crosslinked are the galactomannan gums, glucomannan gums, guars, derivatized guars and cellulose derivatives. Specific examples are guar gum, guar gum derivatives, locust bean gum, tara gum, karaya gum, cassia gum, carboxymethyl cellulose, carboxymethylhydroxyethyl cellulose and hydroxyethyl cellulose. A suitable synthetic polymer is polyvinyl alcohol.

A variety of crosslinking agents have been utilized for crosslinking a polysaccharide gelled aqueous liquid, particularly suitable such crosslinking agents are transition metal containing compounds which release transition metal ions when dissolved in an aqueous liquid and borate releasing compounds. Examples of particularly suitable transition metal ions for crosslinking the polymer gelled aqueous liquids described above are titanium IV (4+), zirconium IV (4+), antimony III (3+), chromium III (3+) and aluminum III (3+). Examples of compounds which are water soluble and which supply zirconium IV ions are zirconium lactate, zirconium carbonate, zirconium acetylacetonate and zirconium diisopropylamine lactate. Compounds capable of supplying titanium IV, antimony III, chromium III and aluminum III are well known to those skilled in the art and comprise similarly conventional compounds such as potassium pyroantimonate, titanium acetylacetonate, titanium triethanolamine, chromium III citrate, aluminum acetate and the like. A borate releasing compound has also been utilized as a crosslinking agent. The particular borate compound used may be any compound which supplies borate ions in a hydrated polysaccharide gelled aqueous liquid. For example, the borate source may be a rapidly soluble borate containing compound such as boric acid, borax or "POLYBOR" manufactured by the U.S. Borax Company. The borate source may also be a slowly soluble borate such as alkaline earth metal borates, alkali metal borates and the like. The use of slowly soluble borate releasing compounds in a gelled aqueous treating fluid delays a significant viscosity increase due to crosslinking until after the treating fluid is pumped into the well bore. The borate releasing compounds may either by hydrated or anhydrous.

See for example the following U.S. patents, incorporated herein by reference: Wadhwa U.S. Pat. No. 4,519,309; Mondshine U.S. Pat. No. 4,619,776; Dawson U.S. Pat. No. 5,145,590; Sharif U.S. Pat. No. 5,160,445; Sharif U.S. Pat. No. 5,252,236; Sharif U.S. Pat. No. 5,266,224; Sharif U.S. Pat. No. 5,310,489; Kinsey U.S. Pat. No. 5,488,083; Kinsey U.S. Pat. No. 5,565,513; Shuchart U.S. Pat. No. 5,759,964; Moorhouse U.S. Pat. No. 6,225,264; and Moorhouse 6,251,838.

It is known to provide the polymer crosslinking agents in the form of a concentrate suspended in an appropriate liquid suspension medium. Thus crosslinking agents have been suspended in aqueous liquids and non-aqueous liquids such as a hydrocarbon such as diesel, mineral oils, and kerosene, and alcohols containing 6–12 carbon atoms, vegetable oils, ester-alcohols, polyol ethers, glycols, animal oils, silicone oils, halogenated solvents, mineral spirits-resin solutions, and oil-resin solutions. See for example U.S. Pat. No. 6,024,170.

Numerous problems exist when utilizing these concentrates. Thus many of the non-aqueous liquid suspension mediums are environmentally unacceptable and have poor suspension and stability characteristics, and many are expensive and difficult to viscosity. Aqueous based concentrates are unacceptable at low temperatures as their viscosity increases such that they become non-pourable or solidify.

SUMMARY OF THE INVENTION

The invention provides a concentrate for the crosslinking of polymers in aqueous solutions which comprises an alkali metal formate solution, a crosslinking agent, a suspension agent, and, optionally, a deflocculant. The preferred crosslinking agent is a sparingly soluble alkali metal borate or alkali metal alkaline earth metal borate. The preferred alkaline metal formate is potassium formate. The preferred suspension agent is a clay mineral selected from the group consisting of smectite clays, palygorskite clays, and mixtures thereof The preferred concentrates are pourable, and, if gelled, exhibit fragile gel strengths such that the concentrates are pourable upon gentle agitation, such as by shaking or rolling the container containing the concentrates, or low shear mixing in large containers.

The invention further provides aqueous base well servicing fluids, preferably hydraulic fracturing fluids, containing an alkali metal formate, preferably potassium formate, and a crosslinked hydrated polysaccharide polymer viscosifier, preferably a galactomannan gum or derivative thereof, the alkali metal formate and the crosslinking agent for the hydrated polysaccharide polymer being provided by the crosslinking concentrate.

The invention also provides for a method of preparing a well servicing fluid, preferably a hydraulic fracturing fluid, comprising hydrating a polysaccharide polymer, preferably a galactomannan gum or derivative thereof, in an aqueous liquid and thereafter crosslinking the polysaccharide with a crosslinking concentrate as set forth herein.

While the invention is susceptible of various modifications and alternative forms, specific embodiments thereof will hereinafter be described in detail and shown by way of example. It should be understood, however, that it is not intended to limit the invention to the particular forms disclosed, but, on the contrary, the invention is to cover all modifications and alternatives falling within the spirit and scope of the invention as expressed in the appended claims.

The compositions can comprise, consist essentially of, or consist of the stated materials. The method can comprise, consist essentially of, or consist of the stated steps with the stated materials.

PREFERRED EMBODIMENTS OF THE INVENTION

The present invention provides improved aqueous crosslinking concentrates for use in well treating fluids such as fracturing fluids, gravel packing fluids, and the like. The concentrates of the invention are environmentally friendly and have a low freezing point enabling their use at lower temperatures. Other advantages of the concentrates of the invention are: non-chloride base solution; excellent solids suspension; and elimination in variations of the crosslink times due to oil-wetting of the crosslinker in non-aqueous based concentrates. The crosslinked well treating fluids prepared with the crosslinking concentrates of the invention exhibit improved sand transport into fractures, and the crosslinked gel re-builds after shearing the fluids.

The crosslinking concentrates of the invention comprise a suspension of a crosslinking agent in an aqueous formate solution, preferably an aqueous potassium formate solution having a density of at least about 9.5 pounds per gallon, preferably at least about 10.0 pounds per gallon.

The crosslinking agent may be any of the known crosslinking compounds as set forth hereinbefore. Preferred are borate releasing compounds. Most particularly preferred are the sparingly soluble borates set forth in Mondshine U.S. Pat. No. 4,619,776, incorporated herein by reference. Such sparingly soluble borates have at least five boron atoms per molecule and are selected from the group consisting of alkaline earth metal borates, alkali metal alkaline earth metal borates, such as ulexite, and mixtures thereof The concentration of the crosslinking agent in the concentrates of the invention generally is in the range from about 100 pounds per 42 gallon barrel of the concentrate to about 250 pounds per 42 gallon barrel of the concentrate, preferably from about 150 to about 200 pounds per 42 gallon barrel of the concentrate. Alternatively, the crosslinking agent is present in the concentrate from about 15% by volume to about 35% by volume, preferably 20% to about 30% by volume.

The crosslinking agent is maintained suspended in the concentrate by incorporating a suspending agent therein. The suspending agent increases the viscosity of the concentrate and prevents the settling of the crosslinking agent. Preferred suspending agents also minimize syneresis, the separation of the liquid medium, i.e., the formate solution, to form a layer on top of the concentrate on aging.

The suspending agent may be a palygorskite clay such as sepiolite, attapulgite, and the like or a smectite clay such as hectorite, montmorillonite, saponite, bentonite, and the like. The suspending agent may be a water soluble polymer which will hydrate in and viscosity the formate brines such as a synthesized biopolymer, such as xanthan gum, a cellulose derivative, a natural polymer or derivative thereof, such as the gums derived from plant seeds. Various combinations of these suspending agents may be utilized in the concentrates of this invention.

The preferred concentrates of the invention preferably are pourable upon gentle agitation) such as shaking or rolling the container containing the concentrate, or low shear mixing in large containers, i.e., the gels must be fragile if the composition gels. Concentrates which do not gel are, of course, pourable and exemplary of the concentrates of the invention.

The concentration of the clay suspending agent in the concentrates of the invention is from about 1 to about 15 pounds per 42 gallon barrel of the concentrates preferably from 2 to about 12 pounds per 42 gallon barrel of the concentrate.

The preferred concentrates contain a deflocculating agent (defloculant). The deflocculant decreases the viscosity and/ or the gel strength of the concentrate, thus enhancing the pourability of the concentrates and/or allowing more suspending agents to be incorporated into the concentrates.

Known deflocculants effective in saline fluids are various synthetic polymers, copolymers, or telomers. Generally these deflocculants will contain at least one monomer which contains an anionic functional group, such as a carboxylic acid or sulfonic acid group. See for example the following U.S. patents, each incorporated herein by reference: U.S. Pat. Nos. 2,911,365; 3,730,900; 3,764,530; 4,680,128; 5,026,490; and 5,287,929; and the patents referenced therein. Thus U.S. Pat. No. 3,730,900 discloses various low molecular weight copolymers of styrene sulfonic acid and maleic anhydride and water soluble salts thereof U.S. Patent No. 3,764,530 discloses certain low molecular weight non-halogen-containing acrylic acid polymers and water soluble salts thereof U.S. Pat. No. 4,680,128 discloses certain copolymers of acrylic acid and vinylsulfonic acid, and alkali metal salts thereof U.S. Pat. No. 5,026,490 discloses certain low molecular weight polymers composed of styrene sulfonate (sodium salt) monomer, maleic anhydride (either as the anhydride or the diacid), and a zwitterionic functionalized maleic anhydride. U.S. Pat. No. 5,287,929 discloses copolymers of a first monomer and a second monomer, wherein the first monomer is maleic anhydride, maleic acid, acrylic acid, or methacrylic acid and the second monomer is sulfonated ethene, sulfonated propene, sulfonated 1-butene, sulfonated 2-butene, sulfonated 1-pentene, sulfonated 2-pentene, sulfonated 2-met hyl-1-butene, sulfonated 2-methyl-2-butene, sulfonated 3-methyl-1-butene, sulfonated cyclopentene, sulfonated cyclohexene, sulfonated 1-hexene, sulfonated 2-hexene, sulfonated 3-hexene, sulfonated 2-methyl-1-pentene, sulfonated 2-methyl-2-pentene, sulfonated 2-methyl-3-pentene, sulfonated 3-methyl-1-pentene, sulfonated 3-methyl-2-pentene, sulfonated 4-methyl-1-pentene, sulfonated 3,3-dimethyl-1-butene, sulfonated 2,3-dimethyl-l-butene, sulfonated 2,3-dimethyl-2-butene, sulfonated 2-ethyl-1-butene, sulfonated 1,3-butadiene, sulfonated 1,3-pentadiene, sulfonated 1,4-pentadiene, sulfonated 2-methyl-1,3-butadiene, sulfonated 2,3-dimethyl-1, 3-butadiene, sulfonated 2-ethyl-butadiene, sulfonated 2-methyl-1,3-pentadiene, sulfonated 3-methyl-1,3-pentadiene, sulfonated 4-methyl-1,3-pentadiene, sulfonated 2-methyl-1,4-pentadiene, sulfonated 3-methyl-1,4-pentadiene, sulfonated 4-methyl-1,4-pentadiene, sulfonated 1,3-hexadiene, sulfonated 1,4-hexadiene, sulfonated 1,5-hexadiene, sulfonated 2,4 -hexadiene, or sulfonated 1,3,5-hexatriene. The sulfonate and carboxylate groups on the copolymers may be present in neutralized form as alkali metal or ammonium salts.

The concentrates of the invention can contain an anti-syneresis agent. Concentrates of suspended solids are known to "bleed" clear liquid on aging, a process known as syneresis whereby liquid separates from the concentrate due to contraction of the solid/liquid mixture. The concentrates of the invention preferably exhibit a maximum syneresis of 15% by volume on static aging the concentrates for sixteen hours at 120° F. (48.9° C.).

Representative anti-syneresis agents (anti-settling agents) are colloidal silicas and hydrophobic, surface modified silicas, preferably fumed silicas, and synthetic water soluble polymers which generally provide viscosity to salt-free aqueous fluids but which do not appreciably enhance the viscosity of the formate brines used in the inventive concentrates.

Exemplary colloidal silicas are set forth in Dobson, Jr. et al. U.S. Pat. No. 5,728,652, incorporated herein by reference. Preferred colloidal silicas are the pyrogenic, fumed silicas. Preferred silicas have an ultimate particle size less than about 100 millimicrons. The silica particles may be loosely aggregated to about a 0.5 to 5 micron size, but when mixed into a liquid deaggregate to less than 100 millimicron sized particles. The concentration of the optional silica anti-syneresis agent in the concentrates of the invention is from 0 to about two pounds per 42 gallon barrel of the concentrate, preferably from about 0.25 to about one pound per 42 gallon barrel of the concentrate.

Exemplary synthetic water soluble polymers which will function as anti-settling agents in the concentrates of the invention are acrylic polymers and hydrophobically modified acrylic polymers, and olefinic copolymer latexes which are well known in the art. Representative polymers in the form of an aqueous 30 weight percent dispersion or emulsion includes RHEOLATE 450 hydrophobically modified alkali swellable acrylic emulsion, RHEOLATE 1 acrylic emulsion, and RHEOLATE 420 alkali swellable acrylic emulsion. EA-2118 is a representative olefinic copolymer suspension/latex. The RHEOLATE products and the EA-2118 can be obtained from Elementis Specialties, Inc., Hightstown, N.J., U.S.A. The concentration of the optional synthetic water soluble polymer anti-syneresis agent is from about 0 to about 7.5 pounds per 42 gallon barrel of the concentrate, preferably from about 0.5 to about 5.0 pounds per 42 gallon barrel of the concentrate, 100% solids basis.

The concentrates of the invention thus comprise an aqueous formate brine having a density of at least 9.5 pounds per gallon, a crosslinking agent in an amount from about 100 pounds to about 250 pounds per 42 gallon barrel of the concentrate, a suspending agent in an amount from about 2 to about 15 pounds per 42 gallon barrel of the concentrate, and optionally, a deflocculant in an amount from about 0 to about 10 pounds per 42 gallon of the concentrate, and also optionally, an anti-syneresis agent as set forth hereinbefore.

Preferred concentrates of the invention comprise an aqueous formate solution having a density of at least about 10.0 pounds per gallon, a borate releasing crosslinking agent in an amount from 100 pounds to about 200 pounds per 42 gallon barrel of the concentrate, a clay suspending agent selected from the group consisting of hectorite, sepiolite, attapulgite, and mixtures thereof, in an amount from about 5 to about 12 pounds per 42 gallon barrel of the concentrate, a deflocculant in an amount from about 0.5 to about 6 pounds per 42 gallon barrel of the concentrate, and, optionally, an anti-syneresis agent in the preferred amount set forth hereinbefore.

The present invention also includes well servicing fluids, such as fracturing fluids and gravel packing fluids, comprising an aqueous liquid, a polysaccharide crosslinkable polymer hydrated therein, and the crosslinking concentrate of this invention.

Generally the polysaccharide polymers used in the present invention are those known in the art as set forth hereinbefore. Preferred are galactomannan gums including naturally occurring gums and their derivatives. Most preferably the polymers are selected from the group consisting of guar gum and guar gum derivatives, such as hydroxypropyl guar, carboxymethyl guar, and carboxymethylhydroxypropyl guar. The polymer is present in the servicing fluid in an amount from about 0.06% to about 0.72% by weight of the water in the fluid.

The amount of the crosslinking concentrate in the well treating fluid is from about 0.1 gallon to about 5 gallons per 1000 gallons of water in the well treating fluid.

The aqueous liquid used to prepare the well servicing fluid preferably contains less than about 5,000 ppm salt. In the preferred operation, fresh water available from municipal water will be used.

The well treating fluids of the invention may additionally contain other materials (additives) well known in the art, such as breakers, bactericides, corrosion inhibitors, clay stabilizers, surfactants, fluid loss additives, and the like. Generally the fluids contain a proppant such as high strength ceramics, sintered bauxite, and sand, all as is well known in the art.

The field preparation and pumping of the fracturing fluid according to the present invention can be performed by either of two processes: continuous mixing or batch mixing.

The preferred process for carrying out the invention is by the continuous mixing as described below.

In the continuous process, water such as city water is drawn from a storage vessel at a known rate and the crosslinkable polymer is metered at a rate calculated to give the desired concentration of polymer in the water. The polymer will generally evenly disperse in the water and hydrate quickly. In the continuous process it is necessary to have fast hydration in order to quickly develop fluid viscosity for suspending the propping materials down the well and into the fracture and generate a fracture of sufficient width. Also, the polymer should be adequately hydrated before the crosslinking reaction occurs in order to maximize the viscosity of the crosslinked gel.

The other additives such as crosslinkers, surfactants, fluid loss additives, proppants, breakers, biocides, etc. are then added to the fluid. The resultant mixture is then pumped at a rate sufficient to initiate and propagate the fracture in the subterranean formation.

In the batch process, the desired amount of copolymer, which is available commercially as a powder or granular product or liquid emulsion, is dispersed in a tank (typically 20,000 gallon) filled with fresh water or city water and circulated for at least thirty minutes to dissolve or disperse the copolymer in the water.

With the copolymer dissolved or dispersed in the water, pumping operations are commenced. The crosslinker suspension and breaker are added to the water "on the fly", so that crosslinking occurs between the surface and the formation. The crosslinked viscosity is developed at a subsurface location and is sufficient to generate the fracture of desired length and geometry.

Following breakdown of the formation in both the continuous and batch process, proppant is added to the fluid and carried to and deposited in the fracture. The well is then shut in permitting the fracture to close on the proppants and the breaker to degrade the crosslinked copolymer.

In some operations, an acid or oxidizing agent may be injected into the formation following the fracture treatment to enhance polymer degradation.

In accordance with the methods of the present invention a subterranean formation or zone penetrated by a well bore is treated to produce a desired result such as forming a gravel pack adjacent to the formation to prevent the migration of fines with produced fluids or to stimulate the formation or zone to increase the production of hydrocarbons therefrom. The methods basically comprise the steps of injecting the gravel packing fluid of this invention, which subsequently breaks into a low viscosity fluid, into the formation or zone by way of the well bore, and then recovering the low viscosity treating fluid from the formation or zone after the treatment has been performed and the high viscosity treating fluid has broken.

The following specific examples are intended to illustrate and advantages of the invention and are not intended to unduly limit the scope of the invention. In these examples and this specification, the following abbreviations may be used: API=American Petroleum Institute; LSRV=Brookfield low shear rate viscosity at 0.03 revolutions per minute, 0.0636 $sec^{-1}$, in centipoise; Fann=Fann API Recommended Practice RP-31B viscosity at 300 rpm; ppg=pounds per gallon; ppb=pounds per 42 gallon barrel; gpb=gallons per 42 gallon barrel; ° F.=degrees Fahrenheit; ° C.=degrees Centigrade; ml=milliliters; min=minutes; cp=centipoise; rpm=revolutions per minute; and g=grams.

In the examples, the crosslinking concentrates contained 174.9 pounds of ulexite per 42 gallon barrel of the concentrate (25.2% by volume) suspended in the indicated quantity of a potassium formate brine (solution). The density of the brine was 11.0 pounds per gallon in Examples 1 and 5, 9.5 pounds per gallon in Example 2 and 10.0 pounds per gallon in Examples 3 and 4.

The crosslinking concentrates were prepared by mixing the suspending agent in the formate brine for 28 minutes on a Hamilton Beach mixer, adding the crosslinking agent and mixing for 5–15 minutes on a Brookfield over head mixer, adding the deflocculant and mixing for 5–15 minutes on a Brookfield overhead mixer, and adding the anti-syneresis agent, if used, and mixing for 5–15 minutes on a Brookfield overhead mixer. The amount of each concentrate was one barrel equivalent (350 milliliters).

The concentrates were generally evaluated for their low shear rate viscosity (LSRV) measured with a Brookfield Model LVTDV-1 viscometer having a number 2 LV spindle at 0.3 revolutions per minute, the reading taken after two minutes, and the Fann viscosity at 300 revolutions per minute measured with a Model 35A Fann viscometer after stirring the concentrates for one minute at moderate shear with a Brookfield over head mixer. The separation, suspension, and gelation characteristics of the concentrates was measured as follows: The concentrate was placed in a 12 ounce glass jar. The height of the concentrate in the jar is 3.5 inches in depth. The jar was then capped and static aged for 16 hours at 120° F., removed from the oven, and cooled for one hour. The syneresis was then measured. The gelation of the concentrate sample was then indicated by gently shaking or stirring the sample. If the concentrate becomes free flowing and pourable, this indicates an acceptable gel strength.

Certain of the concentrates were evaluated for their crosslinking effect on a typical well treating fluid containing 166.7 pounds per 1000 gallons (5 grams) of KCl and 40 pounds per 1000 gallons (1.2 grams) of guar gum (JAGUAR 308NB available from Rhodia, Princeton, N.J., U.S.A.) in 30 gallons equivalent (250 milliliters) of City of Houston, Tex. tap water. The fluid was mixed at low speed on a Waring Blendor for a minimum of 15 minutes to hydrate the guar gum. The pH of the fluid was 8.0. Thereafter, a Variac voltage controller is slowly increased to make a vortex in the third until the impeller blade is exposed. Then 0.3 milliliter of the crosslinking concentrate is added while simultaneously starting a stop watch. The elapsed times required to close the vortex and for the top of the fluid to become static are measured. These are indicated in the tables as X link V and X link ST, respectively.

EXAMPLE 1

Crosslinking concentrates were prepared by mixing together 0.748 barrel equivalents (261.8 milliliters) of a 11.0 pound per gallon potassium formate solution with 3 pounds per 42 gallon barrel (3 grams) of sepiolite clay (SEAMUD®, a product of Industrial Mineral Ventures (IMV), a subsidiary of the Floridan Company, of Las Vegas, Nev. U.S.A)., 0.48 gallons per 42 gallon barrel (4 milliliters) of NALCO® 9762 defloccculant (available from ONDEO NALCO, Sugarland, Tex. U.S.A.), the concentrations of the colloidal silicas set forth in Table I, and 174.9 pounds per 42 gallon barrel of concentrate (174.9 grams per 350 milliliters) of Ulexite, finely ground. The data obtained are set forth in Table I.

TABLE I

| Concentrate | I-1 | I-2 | I-3 |
|---|---|---|---|
| Silica | None | M-5 | TS-610 |
| Silica, ppb (g) | 0 | 0.5 | 0.5 |
| LSRV, cp | 6499 | 6899 | 9298 |
| Fann, cp | 14 | 23 | 28 |
| After heating 16 hours at 120° F. and cooling one hour | | | |
| Syneresis, % | 2.2 | 0.9 | 1.8 |
| Gelation | None | None | None |
| LSRV, cp | 9098 | — | — |
| Fann, cp | 20 | — | — |
| X link V | 2:30 | 1:50* | 1:43* |
| X link ST | 3:05 | 2:08* | 2:05* |

*Tested on original concentrate-no heating

EXAMPLE 2

Crosslinking concentrates were prepared by mixing together 0.748 barrel equivalents (261.8 milliliters) of a 9.5 pound per gallon potassium formate brine with either 4, 5, 6, or 7 pounds of attapulgite clay (FLORIGEL® HY, a product of the Floridan Company, Quincy, Fla.) per 42 gallon barrel (4, 5, 6, or 7 grams, respectively) of the concentrate. The data obtained are set forth in Table II.

TABLE II

| Concentrate | II-1 | II-2 | II-3 | II-4 |
|---|---|---|---|---|
| Attapulgite, ppb | 4 | 5 | 6 | 7 |
| LSRV, cp | 10,398 | 5,599 | 6,399 | 13,999 |
| Fann,cp | 19 | 19 | 24 | 38 |
| After heating 16 hours at 120° F. and cooling one hour | | | | |
| Syneresis, % | 14.3 | 14.3 | <14.3 | 1.8 |
| Gelation | None | None | None | None |
| LSRV, cp | 7,798 | 18,996 | 30,793 | 24,895 |
| Fann, cp | 20 | 20 | 27 | 42 |

EXAMPLE 3

A crosslinking concentrate was prepared by mixing together 0.75 barrel equivalents (262.5 milliliters) of a 10.0 pound per gallon potassium formate solution with either 9 ppb (9 grams) or 11 ppb (11 grams) of sepiolite clay (SEA-MUD), 174.9 ppb finely ground ulexite (174.9 grams per 350 milliliters of concentrate), and 0.38 gpb (3.2 milliliters) of NALCO 9762 deflocculant. The data are set forth in Table III.

TABLE III

| Concentrate | III-1 | III-2 |
|---|---|---|
| Sepiolite, ppb | 9.0 | 11.0 |
| LSRV, cp | 22,555 | 42,391 |
| Fann,cp | 19 | — |
| After heating 16 hours at 120° F. and cooling one hour | | |
| Syneresis, % | 5.4 | 3.6 |
| Gelation | None | None |

EXAMPLE 4

A crosslinking concentrate was prepared by mixing together on a Hamilton Beach mixer at low shear 0.482 barrel equivalents (168.63 milliliters) of a saturated aqueous solution of ulexite and 6.25 ppb (6.25 grams) of purified hectorite clay (BENTONE MA, a product of Elementis Specialties, Hightstown, N.J., U.S.A.) for 15 minutes. Thereafter there were added incrementally with five minutes mixing, with a Brookfield overhead mixer, between additions 0.268 barrel equivalents (93.87 milliliters) of a 13.0 ppg potassium formate brine, 0.144 gpb (1.2 milliliters) of ZONYL® FSG (available from DuPont, Wilmington, Del., U.S.A., a fluorosurfactant), 174.9 ppb finely ground ulexite (174.9 grams), and 0.336 gpb (2.8 milliliters) of NALCO 9762 deflocculant. The initial LSRV and Fann 300 rpm viscosity were 36,392 cp and 42 cp respectively. After aging 16 hours at 120° F. and cooling, the concentrate exhibited no gelation and no settling, and about 3.5% syneresis.

What is claimed is:

1. A concentrate for the crosslinking of polymers in aqueous solutions which comprises an alkali metal formate solution, a crosslinking agent suspended therein, and a suspension agent, wherein the suspension agent is a clay mineral selected from the group consisting of smectite clays, palygorskite clays, and mixtures thereof, and wherein the crosslinking agent is a sparingly soluble alkali metal or alkali metal alkaline earth metal borate in an amount from about 100 to about 250 pounds per 42 gallon barrel of the concentrate.

2. The concentrate of claim 1 wherein the concentrate is pourable or, if gelled, exhibits fragile gels such that the concentrate is pourable upon gentle agitation or low shear mixing.

3. The concentrate of claim 2 wherein the alkali metal formate solution is a potassium formate solution having a density of at least about 9.5 pounds per gallon.

4. The concentrate of claim 1 wherein the concentration of the suspension agent is in an amount from about 2 to about 15 pounds per 42 gallon barrel of the concentrate.

5. The concentrate of claim 4 wherein the suspension agent is a clay selected from the group consisting of hectorite, sepiolite, attapulgite, and mixtures thereof.

6. The concentrate of claim 5 which contains from about 0.5 to about 6 pounds per 42 gallon barrel of the concentrate of a deflocculant.

7. The concentrate of claim 6 which contains an anti-syneresis agent.

8. A concentrate for the crosslinking of polymers in aqueous solutions which comprises an alkali metal formate solution having a density of at least about 9.5 pounds per gallon, a crosslinking agent suspended therein wherein the crosslinking agent is a sparingly soluble alkali metal or alkali metal alkaline earth metal borate in an amount from about 100 to about 250 pounds per 42 gallon barrel of the concentrate, and a suspension agent selected from the group consisting of smectite clays, palygorskite clays, and mixtures thereof in an amount from about 2 to about 15 pounds per 42 gallon barrel of the concentrate.

9. The concentrate of claim 8 which contains from about 0.5 to about 6 pounds per 42 gallon barrel of the concentrate of a deflocculant.

10. The concentrate of claim 9 which contains an anti-syneresis agent.

11. The concentrate of claim 8 wherein the suspension agent is a clay selected from the group consisting of hectorite, sepiolite, attapulgite, and mixtures thereof.

12. The concentrate of claim 8 wherein the suspension agent is a clay selected from the group consisting of sepiolite, attapulgite, and mixtures thereof.

13. The concentrate of claim 1 wherein the alkali metal formate solution is a potassium formate solution having a density of at least about 9.5 pounds per gallon.

14. A method of preparing a formate-containing fracturing fluid which comprises hydrating a galactomannan gum or derivative thereof in an aqueous liquid and thereafter crosslinking the galactomannan gum with the concentrate of claim 1, 2, 3, 4, 5, 6, 7, 8, 9, 10, 11, 12, or 13.

15. The concentrate of claim 4 wherein the alkali metal formate solution is a potassium formate solution having a density of at least about 9.5 pounds per gallon.

16. The concentrate of claim 5 wherein the alkali metal formate solution is a potassium formate solution having a density of at least about 9.5 pounds per gallon.

17. The concentrate of claim 6 wherein the alkali metal formate solution is a potassium formate solution having a density of at least about 9.5 pounds per gallon.

18. The concentrate of claim 7 wherein the alkali metal formate solution is a potassium formate solution having a density of at least about 9.5 pounds per gallon.

* * * * *